US011626881B2

United States Patent
Ji et al.

(10) Patent No.: US 11,626,881 B2
(45) Date of Patent: Apr. 11, 2023

(54) PHYSICAL UNCLONABLE FUNCTION (PUF)-BASED METHOD FOR ENHANCING SYSTEM RELIABILITY

(71) Applicant: SHANGHAI JIAO TONG UNIVERSITY, Shanghai (CN)

(72) Inventors: Zhigang Ji, Shanghai (CN); Yongkang Xue, Shanghai (CN)

(73) Assignee: SHANGHAI JIAO TONG UNIVERSITY

( * ) Notice: Subject to any disclaimer, the term of this patent is extended or adjusted under 35 U.S.C. 154(b) by 136 days.

(21) Appl. No.: 17/392,864

(22) Filed: Aug. 3, 2021

(65) Prior Publication Data
US 2022/0085817 A1 Mar. 17, 2022

(30) Foreign Application Priority Data
Aug. 4, 2020 (CN) .......................... 202010771914.3

(51) Int. Cl.
| | | |
|---|---|---|
| G11C 5/14 | (2006.01) | |
| G11C 7/12 | (2006.01) | |
| G11C 8/08 | (2006.01) | |
| H03K 19/003 | (2006.01) | |
| H04L 9/08 | (2006.01) | |
| H04L 9/32 | (2006.01) | |
| H03K 19/17768 | (2020.01) | |

(52) U.S. Cl.
CPC ....... *H03K 19/17768* (2013.01); *G11C 5/146* (2013.01); *G11C 7/12* (2013.01); *G11C 8/08* (2013.01); *H03K 19/00315* (2013.01); *H04L 9/0869* (2013.01); *H04L 9/3278* (2013.01)

(58) Field of Classification Search
None
See application file for complete search history.

(56) References Cited

U.S. PATENT DOCUMENTS

| | | | |
|---|---|---|---|
| 2018/0013431 A1* | 1/2018 | Bury | H04L 9/0861 |
| 2019/0305971 A1* | 10/2019 | Li | G11C 7/02 |
| 2020/0162271 A1* | 5/2020 | Cambou | H04L 63/0435 |
| 2020/0213140 A1* | 7/2020 | Cambou | H04L 9/3278 |

* cited by examiner

*Primary Examiner* — Anh Q Tran
(74) *Attorney, Agent, or Firm* — Katten Muchin; Rosenman LLP

(57) ABSTRACT

A physical unclonable function (PUF)-based method for enhancing system reliability is provided, including: requesting, by a client, data transmission with a server; randomly selecting, by the server, a plurality of metal oxide semiconductor (MOS) devices in an MOS array, and acquiring positional information of the plurality of MOS devices; calculating, by the server, a probabilistic PUF that the trap in each of the plurality of MOS devices is occupied by a carrier and constructing a probabilistic model; randomly generating, by the server, detection time according to the probabilistic model and sending the detection time and the positional information to the client; and determining, by the server, an occupancy probability of the trap in each of the plurality of MOS devices at the detection time according to the probabilistic model, and generating a theoretical code key.

14 Claims, 8 Drawing Sheets

```
Command line interface
x =

227   245   140   35   38   66   214   65 y =

12   4   14   5   3   4   9   7 t_detect =

```
Command line interface
probability =
  0.9950  0.9890  0.9610       0       0  0.8890       0  1.0000
code_theo =
  [ 0 ]   2       1            2       0                 [ 0 ]
          2       1                    1                 [ 1 ]
code_real =
  [ 0 ]   1       1            0       1                 [ 0 ]
          0       1                    0                 [ 1 ]
```

PHYSICAL UNCLONABLE FUNCTION (PUF)-BASED METHOD FOR ENHANCING SYSTEM RELIABILITY

CROSS REFERENCE TO RELATED APPLICATION

This patent application claims the benefit and priority of Chinese Patent Application No. 202010771914.3 filed on Aug. 4, 2020, the disclosure of which is incorporated by reference herein in its entirety as part of the present application.

TECHNICAL FIELD

The present disclosure relates to the technical field of information security, and in particular, to a physical unclonable function (PUF)-based method for enhancing system reliability.

BACKGROUND ART

The PUF refers to a multi-input multi-output (MIMO) system based on intrinsic properties of hardware devices. Due to random variations and inconsistent behaviors of metal oxide semiconductor (MOS) devices during doping, aging and so on, intrinsic differences of the devices are utilized to generate a series of challenge response pairs (CRPs), thereby implementing encryption for an information system. Since the implementation of first PUF-based hardware based on an optical system, various PUFs based on the MOS devices have been proposed and put into use gradually. The PUFs are completely dependent on intrinsic properties of bottom physical layers, resulting in that response functions of the devices cannot be derived mathematically. Moreover, with the low cost, small size and low power consumption of the PUFs, generating keys with the PUFs to improve the security is gradually employed by more security and defense systems.

There have been a number of PUFs based on the MOS devices, most of which are implemented based on the difference in threshold voltage ($V_{th}$) between the devices. Responsive to the aging of the devices, offset of the $V_{th}$ occurs, and the PUFs of the MOS devices also change, thereby greatly reducing the robustness of the security systems. However, time constants of noise signals are closely associated with activation energy of traps, and noise is also effective against electrical stresses. By virtue of strong stability of the noise, the use of the noise in the PUFs, i.e., random telegraph noise physical unclonable functions (RTN PUFs), will significantly improve the reliability and robustness of the security systems.

The existing RTN PUFs, which implement the high stability and robustness of the systems, only make a response to the presence or absence of traps in the MOS devices, and are "weak" PUFs with a small challenge response pairs space (CRPs space). They cannot adapt to authentication systems in need of a large number of CRPs and are greatly restricted in applicable scenarios. Moreover, the existing PUFs manage the keys by inputting all CRPs to a database, which will increase loads of a server and reduce the working efficiency of the server for "strong" PUFs exponentially having the CRPs space. Therefore, how to generate enough CRPs on the authentication systems, i.e., how to implement the "strong" PUF to adapt to more application scenarios, reduce the data storage capacity of the server and improve the working efficiency of the server, becomes a problem to be solved at present.

SUMMARY

In view that the technical problems to be solved urgently at present are how to implement the "strong" PUF to adapt to more application scenarios, reduce the data storage capacity of the server and improve the working efficiency of the server, the present disclosure provides a PUF-based method for enhancing system reliability.

The present disclosure solves the technical problems by following technical solutions:

A PUF-based method for enhancing system reliability includes:

requesting, by a client, data transmission with a server;

randomly selecting, by the server, a plurality of MOS devices in an MOS array, and acquiring positional information of the plurality of MOS devices;

calculating, by the server, according to a stored intrinsic parameter of a trap in each of the plurality of MOS devices, a time constant of the trap, calculating a probabilistic PUF for each of the plurality of MOS devices and constructing a probabilistic model;

randomly generating, by the server, detection time according to the probabilistic model and sending the detection time and the positional information to the client; and determining, by the server, a probability that the trap in each of the plurality of MOS devices is occupied at the detection time according to the probabilistic model, and generating a theoretical code key, the theoretical code key comprising a theoretical authentication bit and a theoretical uncertain bit.

Preferably, after the sending the detection time and the positional information to the client, the method may further include:

positioning, by the client, the plurality of MOS devices by controlling a word line (WL) and a bit line (BL) according to received positional information, and pre-charging the trap by applying a high bias voltage to the plurality of MOS devices; and adjusting the bias voltage for the plurality of MOS devices as a low bias voltage, detecting a carrier release condition of each of the plurality of MOS devices from a moment when the low bias voltage is applied to the detection time, and generating a real code key, the real code key including a real authentication bit and a real uncertain bit.

Further, the client may generate the real code key repeatedly:

the real uncertain bit keeps a generated value when the real uncertain bits generated repeatedly are consistent; and the client generates a trigger signal to a true random number generator (TRNG) when the real uncertain bits generated repeatedly are inconsistent, where the TRNG generates a signal to replace a value on an inconsistent bit.

More preferably, the theoretical code key and the real code key are matched for determination:

authentication is successful when the theoretical authentication bit is consistent with the real authentication bit; and the authentication is unsuccessful when the theoretical authentication bit is inconsistent with the real authentication bit.

Preferably, before the requesting, by a client, data transmission with a server, the method may further include:
establishing a database of the probabilistic PUF in the server, where a probabilistic model stored in the database may significantly reduce a data storage capacity of the server and improve working efficiency of the server.

Preferably, the intrinsic parameter may include: a trap position, a trap energy level, and activation energy.

Preferably, the time constant may include a carrier release time constant and a carrier capture time constant.

Further, the probabilistic PUF may be constructed with RTN, and may also be constructed with any material or device having a probabilistic change.

On the basis of conforming to common knowledge in the field, the above-mentioned preferred conditions can be combined arbitrarily to obtain preferred examples of the present disclosure.

The present disclosure has the following beneficial effects: The present disclosure has a large CRPs space to meet requirements of the "strong" PUF, greatly reduces the data storage capacity in the server, and significantly improves the working efficiency of the server; and the present disclosure has the desirable uniqueness to uniquely identify a physical device, the high robustness and the function of automatically encrypting a transmission key, and reduces the design and manufacture cost.

BRIEF DESCRIPTION OF THE DRAWINGS

FIG. 5 shows detection time and positional information of an MOS device in a PUF-based method for enhancing system reliability according to an embodiment of the present disclosure.

FIG. 7 is an authentication diagram of matching on a theoretical code key and a real code key in a PUF-based method for enhancing system reliability according to an embodiment of the present disclosure.

DETAILED DESCRIPTION OF THE EMBODIMENTS

In order to facilitate the understanding of this application, this application is described more comprehensively below with reference to the accompanying drawings. The preferred embodiments of this application are given in the accompanying drawings. However, this application may be implemented in many different forms and is not limited to the embodiments described in this specification. On the contrary, these embodiments are provided, so that the disclosure of this application is more thorough and comprehensive.

It should be noted that when a component is considered to be "connected" to another component, the component may be directly connected to the other component and integrated with the other component, or there may be an intermediate component. The terms "mount", "an end", "another end", and similar expressions used in this specification are used for illustrative purposes only.

Unless otherwise defined, all technical and scientific terms used in this specification have the same meaning as that commonly understood by a person skilled in the art of this application. The terms used herein are merely for the purpose of describing specific embodiments, and are not intended to limit this application. The term "and/or" used herein includes any and all combinations of one or more of the associated listed items.

Figure 1:
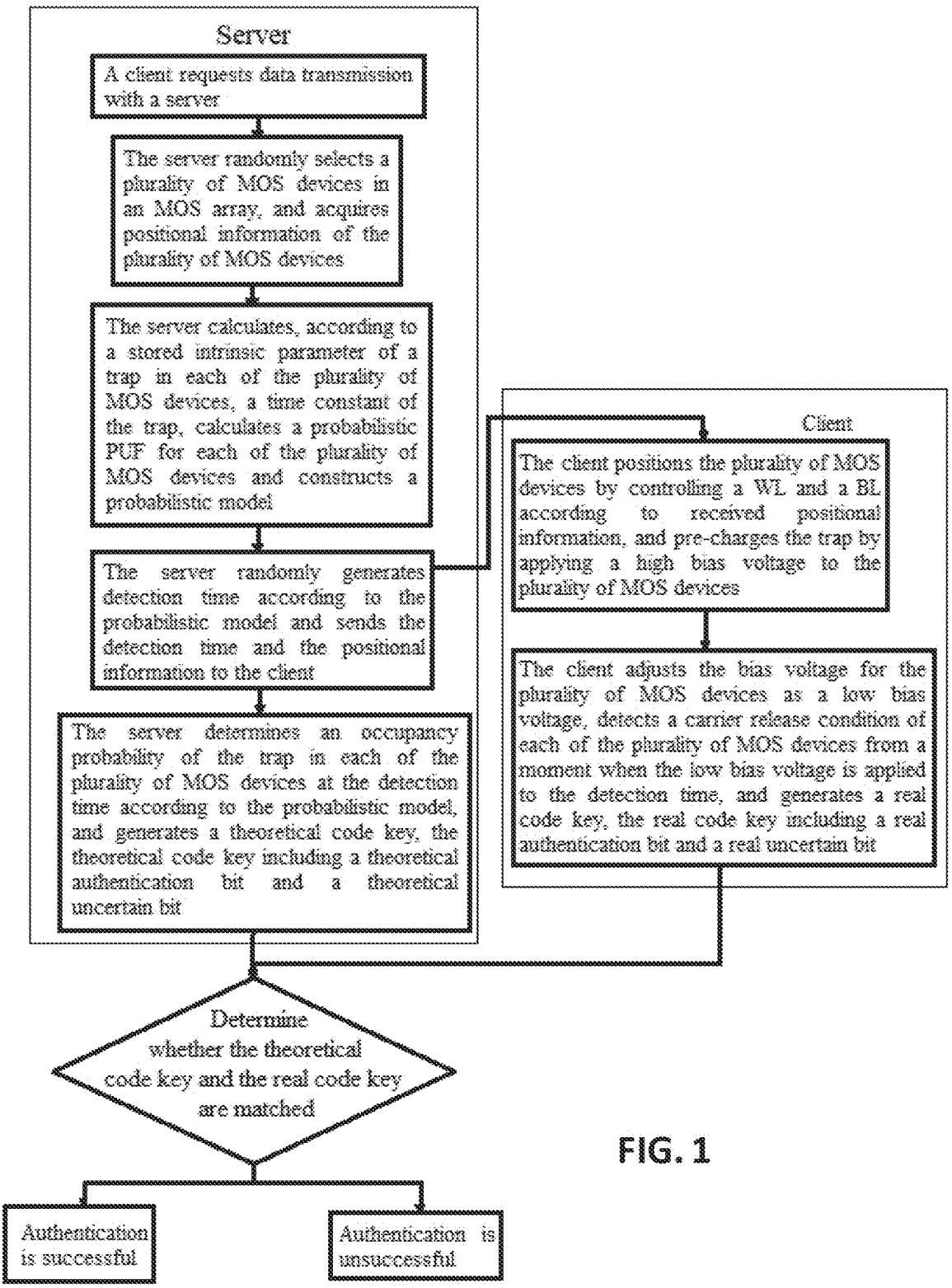
FIG. 1 is a flow chart of a PUF-based method for enhancing system reliability according to an embodiment of the present disclosure.

FIG. 1 is a flow chart of a PUF-based method for enhancing system reliability according to an embodiment of the present disclosure.

A client requests data transmission with a server.

In an example, at the start of authentication, the client sends its own identity information to the server, and the server automatically searches the database for a stored parameter of a probabilistic PUF according to the identity information.

The server randomly selects a plurality of MOS devices in an MOS array, and acquires positional information of the plurality of MOS devices.

Figure 2:
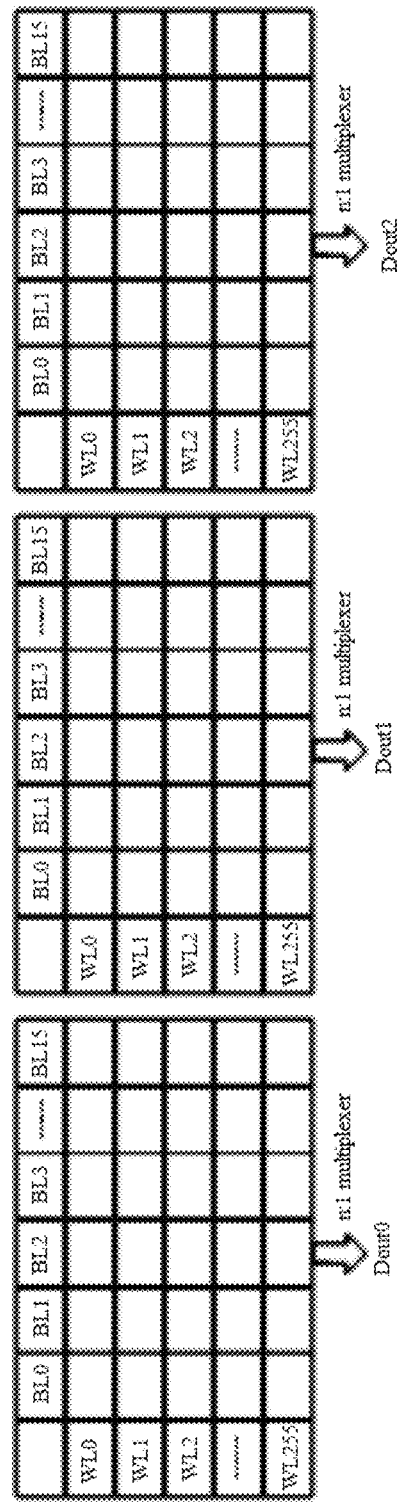
FIG. 2 is a schematic view of an MOS array in a PUF-based method for enhancing system reliability according to an embodiment of the present disclosure.

In an example, as shown in FIG. 2, the MOS array is connected to the WL and the BL, the WL ranges from WL0 to WL255, and the BL ranges from BL0 to BL15. As to the positional information of the plurality of MOS devices, as shown in FIG. 5, coordinates of the plurality of MOS devices are given.

The server calculates, according to a stored intrinsic parameter of a trap in each of the plurality of MOS devices, a time constant of the trap, calculates a probabilistic PUF for each of the plurality of MOS devices and constructs a probabilistic model.

In an example, noise in the MOS devices is mainly arising from random capture and release of traps on gate oxide layers for carriers in channels, and this is a Markov process between two states (the traps are empty or occupied). Under the condition of capturing the carriers, i.e., when the bias voltage increases, the capture rate of the trap increases with the increase in the duration of bias voltage:

$$O(t_s) = [1 - O(t_s = 0)] \times \left[1 - \exp\left(-\frac{t_s}{\tau_c}\right)\right]$$

Under the condition of releasing the carriers, i.e., when the bias voltage decreases, the capture rate of the trap decreases exponentially with the increase in the duration of bias voltage:

$$O(t_r) = O(t_r = 0) \times \exp\left(-\frac{t_r}{\tau_e}\right)$$

where, $\tau_e$ and $\tau_c$ are respectively a carrier release time constant and a carrier capture time constant, and $t_r$ and $t_s$ are respectively a duration of the bias voltage in the conditions of releasing the carriers and capturing the carriers. The time constants of the traps in the MOS devices may be derived according to manufacture processes and working conditions from the intrinsic parameters of the MOS devices such as the trap positions (XT), trap energy levels ($E_{T0}$) and activation energy $\Delta E_B$, thereby generating the probabilistic PUFs and constructing the probabilistic model. FIG. 2 shows an MOS array stored in the server. There are 128 bits of outputs, Dout1 . . . Dout128, and each bit of output is generated by any MOS device in the 256*16 array. Theoretically, the CRPs space may reach:

$$N_{CRPs} = \binom{256 \times 16}{1}^{128} = 2.4 \times 10^{462}$$

where, the data storage capacity of the database for the probabilistic PUF-based model of a single chip is expressed as:

$$L = 256*16*128*3 = 1{,}572{,}854$$

Compared with the proposed "strong" PUF having the large CRPs space, this data capacity significantly reduces the data loads of the server and significantly improves the working efficiency of the server.

Figure 8:
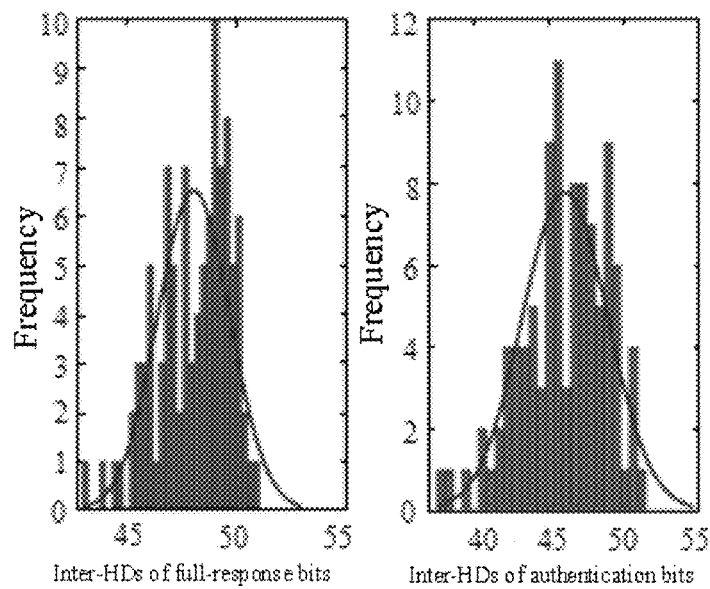
FIG. 8 is a schematic view of an inter-chip hamming distance (inter-HD) of a probabilistic PUF in a PUF-based method for enhancing system reliability according to an embodiment of the present disclosure.

In an example, the probabilistic PUF is intended to generate a "tag" (like a human fingerprint) based on a bionic concept to uniquely identify the physical device. However, whether the probabilistic PUF can uniquely identify the device is measured by an inter-HD between two probabilistic PUF-based systems. The inter-HD refers to a difference between output responses generated by the two probabilistic PUF-based systems when the same challenge is applied onto them, in an attempt to reflect the similarity between the two different probabilistic PUF-based systems. Ideally, it is generally expected that the inter-HD of the probabilistic PUF-based system approaches to 50% as much as possible. The simulation experiments on the inter-HD are as shown in FIG. 8, in which the inter-HDs of the full-response bits are illustrated on the left, and the inter-HDs of the authentication bits are illustrated on the right. It is a common practice to define all bits of the output response as the full-response bits, the full-response bits including authentication bits and uncertain bits. The authentication bits are used for identity verification, while the other uncertain bits merely make the competitor confused during transmission and are not used for the identity verification. As can be seen from FIG. 8, the two types of inter-HDs are in accord with normal distribution, where the inter-HDs of the full-response bits have a mean of 48-50%, and those of the authentication bits have a mean of 45-48%. The means of the two types of inter-HDs are approximate to 50%, indicating that the probabilistic PUF can uniquely identify the physical device, and manifesting the uniqueness of the probabilistic PUF.

Figure 9:
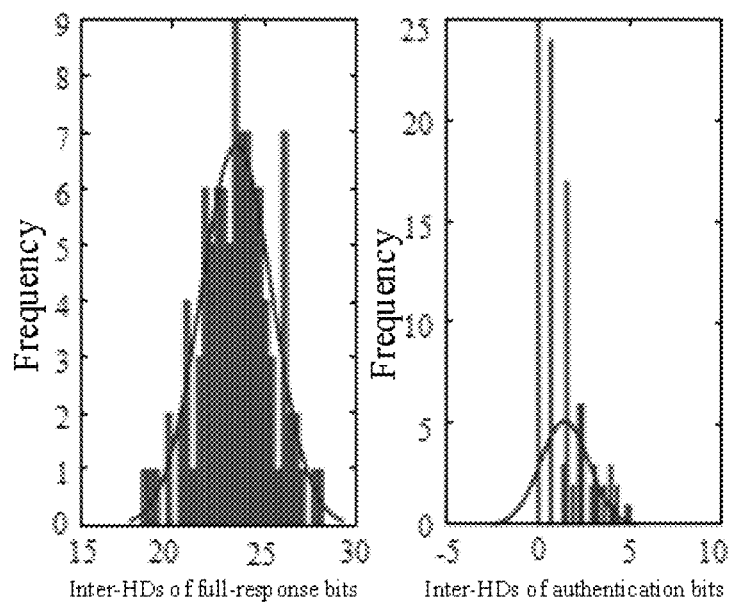
FIG. 9 is a schematic view of an intra-chip hamming distance (intra-HD) of a probabilistic PUF in a PUF-based method for enhancing system reliability according to an embodiment of the present disclosure.

In an example, the probabilistic PUF-based system is inevitably affected by slight fluctuations of test conditions such as the temperature or voltage under real working environment, such that the output response is deviated (in a form of a jump at some bit). However, in case of a substantial difference between the real output response and the output response recorded by the server during the identity authentication, the success rate of the authentication will be directly affected, thereby reducing the reliability of the probabilistic PUF-based system. Therefore, an intra-HD of the probabilistic PUF-based system is used to determine the output stability of the probabilistic PUF-based system. The intra-HD refers to the difference in the output responses generated each time the same challenge is applied to the same probabilistic PUF-based system. The intra-HD comes down to reflecting the stability of the probabilistic PUF-based system, and this attribute is also typically called the robustness of the probabilistic PUF-based system. Ideally, it is generally expected that the intra-HD of the probabilistic PUF approaches to 0 as much as possible. The intra-HD is as shown in FIG. 9. In FIG. 9, the intra-HDs of the full-response bits are illustrated on the left, and the intra-HDs of the authentication bits are illustrated on the right. As can be seen from FIG. 9, the two types of intra-HDs are also in accord with the normal distribution. The mean for the intra-HDs of the authentication bits is basically equal to 0, which meets requirements of a high-robustness probabilistic PUF-based system under ideal conditions. The intra-HDs of the full-response bits have a mean of 23-25%. This cannot meet the high robustness seemingly, but there are the uncertain bits in the full-response bits that make the competitor confused during transmission to automatically encrypt the key rather than for authentication of the identity. In this case, even though the large mean distribution of the intra-HDs of the full-response bits shows the "low" output stability of the probabilistic PUF-based system, or "poor" uniqueness of the probabilistic PUF-based system for the device to which it is belongs, the automatic and random fuzzy processing for a transmission key is effective against well-equipped hackers to crack the internal relation between the challenge and the response of the security system even with methods such as machine learning, thereby further improving the security of the probabilistic PUF-based system from another perspective. Therefore, without affecting the accuracy of authentication of the server for identities of visitors, the probabilistic PUF automatically encrypts the transmission key, which accelerates the security of the probabilistic PUF-based system, omits a transmission key encryption module in the probabilistic PUF-based system to reduce the cost of design and manufacture, and further improves the operation efficiency of the probabilistic PUF.

Figure 4:
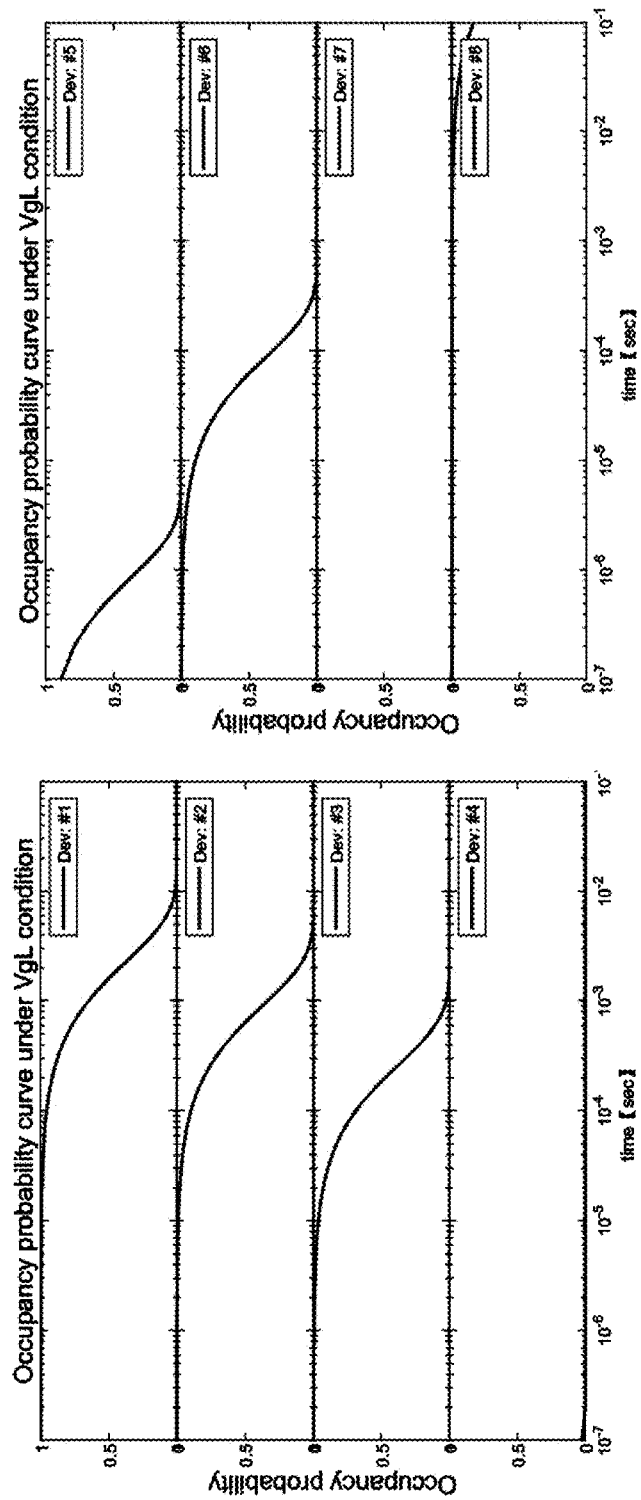
FIG. 4 is a characteristic diagram showing that a trap of an MOS device in a server captures a carrier in a PUF-based method for enhancing system reliability according to an embodiment of the present disclosure.

In an example, FIG. 4 shows a characteristic diagram of a probability that a carrier occupies a trap under a low bias voltage VgL. Each characteristic curve in the figure is a probabilistic PUF derived according to the intrinsic parameter, time constant and the above formula for each selected MOS device in the server. The detection time is randomly generated and is $9.0 \times 10^{-6}$ s as shown in FIG. 5. The longitudinal axis in FIG. 4 is a probability of capturing the carrier by the trap of the MOS device. As can be seen from the figure, when the transverse axis has a coordinate of $9.0 \times 10^{-6}$ s, there is a corresponding probability on the longitudinal axis to capture the carrier. If the trap occupancy probability based on the probabilistic PUF-based model is less than 1% at the detection time, i.e., there is a possibility of more than 99% that the trap will release the carrier, the server determines that the trap releases the carrier at a large probability under this challenge and labels an output at the response bit as "1". If the trap occupancy probability based on the probabilistic PUF-based model is more than 99% at the detection time, i.e., there is a possibility of less than 1% that the trap will release the carrier, the server determines that the trap releases the carrier at a small probability under this challenge and labels an output at the response bit as "0". In other cases, i.e., the trap occupancy probability based on the probabilistic model is 1-99%, the server determines it is an uncertain event that trap releases the carrier, and labels an output at the response bit as "X", which is replaced by "2" in the system, as shown in FIG. 7.

The server randomly generates detection time according to the probabilistic model and sends the detection time and the positional information to the client.

In an example, FIG. 5 shows an MOS array of some output Dout at the detection time of $9.0*10^{-6}$ s. Positional coordinates of MOS devices are respectively (227, 12), (245, 4), (140, 14), (35, 5), (38, 3), (66, 4), (214, 9) and (65, 7).

The server determines a probability that the trap in each of the plurality of MOS devices is occupied at the detection time according to the probabilistic model, and generates a theoretical code key including a theoretical authentication bit and a theoretical uncertain bit.

When a voltage is applied, the probability that each trap in the MOS device is occupied as a function of time is different. The probability that each trap in some MOS device captures the carrier is varied at a certain given time. For example, the trap 1 has an occupancy probability of 99.99% and the trap 3 has an occupancy probability of 0, which is equivalent to that whether the two traps are occupied by the carrier under the present challenge belongs to a certain event. In this case, the server may provide the bit value of the trap 1 as "1" and the bit value of the trap 3 as "0". The trap 2 has an occupancy probability of 7% at the given time, i.e., whether the trap is occupied by the carrier under the challenge belongs to an uncertain event, and thus the server may provide the bit value of the trap 2 as "X". For some MOS device having a number of traps, the first trap of the MOS device is used to determine the trap conditions on capture or release of the carrier.

In an example, as shown in FIG. 4 and FIG. 7, by applying a low voltage $V_{gL}$ to gates of the MOS devices, Dev1 (i.e., the device 1) has a probability of more than 99% (99.5%) to capture the carrier at the detection time, and the bit is output as 0; Dev2 (i.e., the device 2) has a probability of more than 1% and less than 99% (98.9%) to capture the carrier at the detection time, and the bit is output as 2; Dev3 (i.e., the device 3) has a probability of more than 1% and less than 99% (96.1%) to capture the carrier at the detection time, and the bit is output as 2; Dev4 (i.e., the device 4) has a probability of less than 1% (0%) to capture the carrier at the detection time, and the bit is output as 1; Dev5 (i.e., the device 5) has a probability of less than 1% (0%) to capture the carrier at the detection time, and the bit is output as 1; Dev6 (i.e., the device 6) has a probability of more than 1% and less than 99% (88.9%) to capture the carrier at the detection time, and the bit is output as 2; Dev7 (i.e., the device 7) has a probability of less than 1% (0%) to capture the carrier at the detection time, and the bit is output as 1; and Dev8 (i.e., the device 8) has a probability of more than 99% (100%) to capture the carrier at the detection time, and the bit is output as 0. The first, fourth, fifth, seventh and eighth bits are theoretical authentication bits, and the second, third and sixth bits are theoretical uncertain bits.

The client positions the plurality of MOS devices by controlling a WL and a BL according to received positional information, and pre-charges the trap by applying a high bias voltage to the plurality of MOS devices.

In an example, the client positions the MOS devices by controlling the WL and the BL, and pre-charges the trap by applying the high bias voltage to the plurality of MOS devices, such that the trap in each of the plurality of MOS devices is occupied as much as possible before restoration.

The client adjusts the bias voltage for the plurality of MOS devices as a low bias voltage, detects a carrier release condition of each of the plurality of MOS devices from a moment when the low bias voltage is applied to the detection time, and generates a real code key. The real code key includes a real authentication bit and a real uncertain bit.

Figure 6:
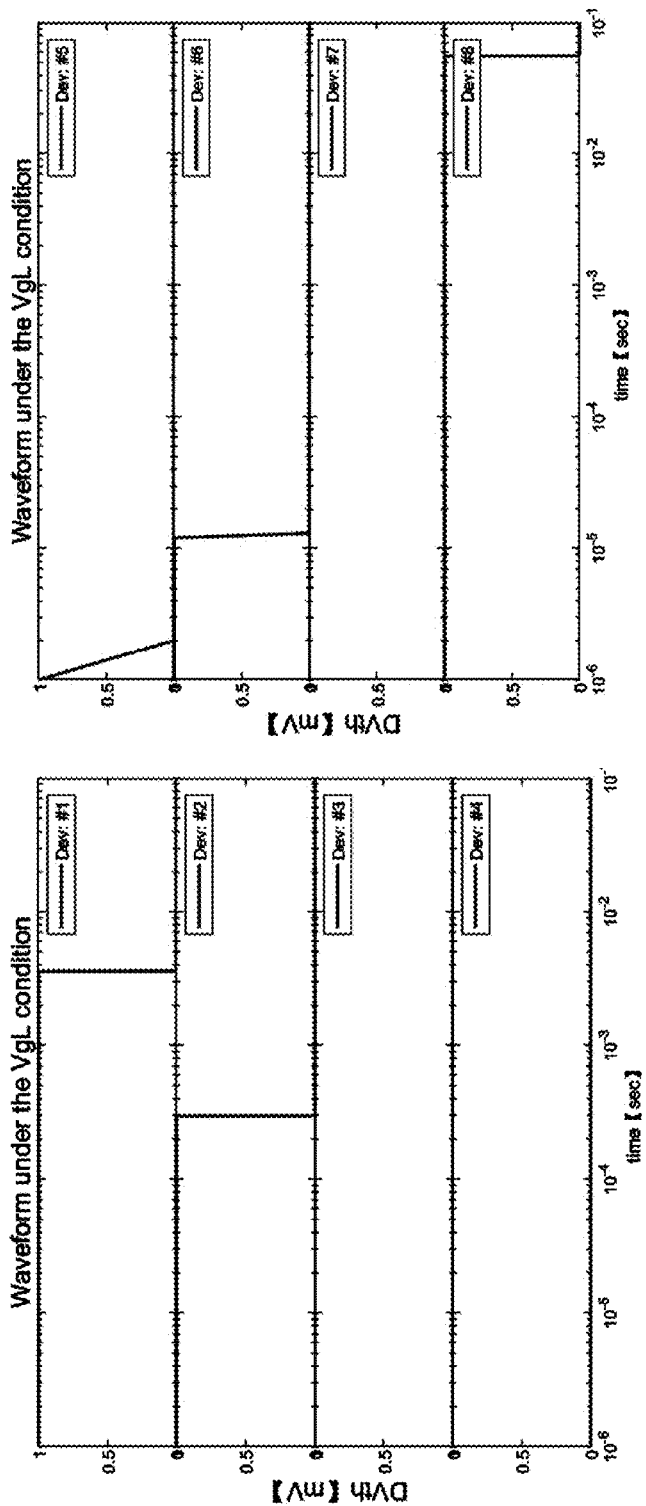
FIG. 6 is a characteristic diagram showing that an MOS device in a client detects release of a carrier in a PUF-based method for enhancing system reliability according to an embodiment of the present disclosure.

In an example, FIG. 6 is an oscillogram at a low bias voltage VgL, where the vertical axis is a threshold voltage fluctuation, and the horizontal axis is time. The client determines a state of the trap at the detection time according to a waveform of the threshold voltage fluctuation DVth of each of the plurality of MOS devices to generate the real code key. That is, from 0 s, i.e., the time when the high bias voltage is converted into the low bias voltage to the detection time, if there is an obvious jump, i.e., the jump of the channel current rises, and the jump of the threshold voltage fluctuation DVth falls, the behavior that the trap releases the carrier occurs; or otherwise, the behavior that the trap releases the carrier does not occur.

The authentication is successful when the theoretical authentication bit is consistent with the real authentication bit.

The authentication is unsuccessful when the theoretical authentication bit is inconsistent with the real authentication bit.

In an example, the theoretical code key includes the theoretical authentication bit and the theoretical uncertain bit, and the real code key includes the real authentication bit and the real uncertain bit. In the process of matching the theoretical code key and the real code key for determination, it is considered that the authentication is successful and the identity of the client is secure only when the theoretical authentication bit is consistent with the real authentication bit; and if the theoretical authentication bit is inconsistent with the real authentication bit, it may be considered that the authentication is unsuccessful, the identity of the client is insecure and there is a risk that the hacker or malicious organization steals secret information. As shown in FIG. 7, the theoretical code key (code_theo) is 02211210, and the real code key (code_real) is 00111010. The authentication bits of the theoretical code key and the real code key are on the first, fourth, fifth, seventh and eighth bits with the same code, while the uncertain bits of the theoretical code key and the real code key are on the second, third and sixth bits with different codes. Nevertheless, as the theoretical authentication bits are consistent with the real authentication bits, the authentication is successful.

Figure 3:
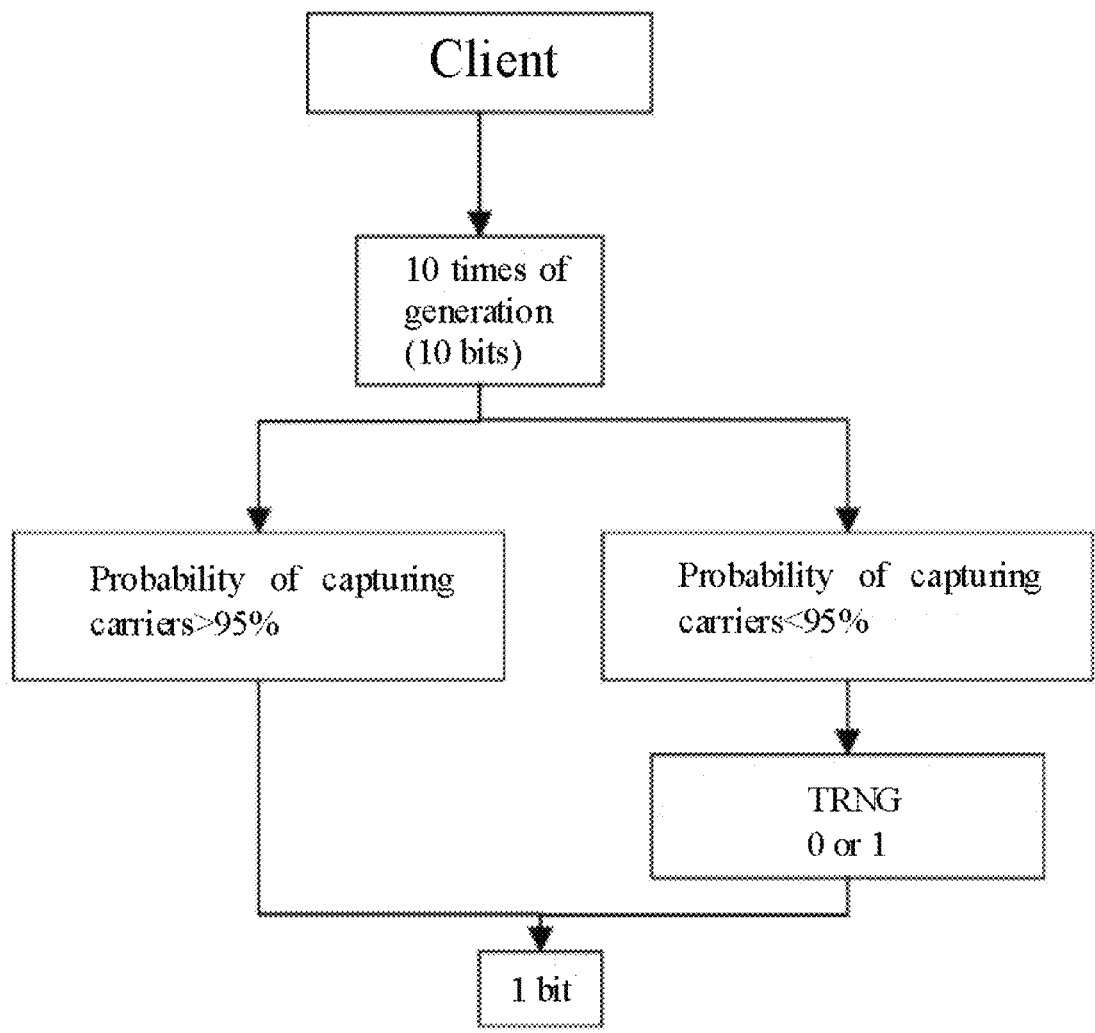
FIG. 3 shows a solution for expansion of an entropy of a real code key in a PUF-based method for enhancing system reliability according to an embodiment of the present disclosure.

In an optional example, FIG. 3 shows a solution for expansion of an entropy of a real code key according to an embodiment of the present disclosure. The bit on which the MOS device has a trap occupancy probability of 1-99% at the given detection time is called the uncertain bit. As whether the trap releases the carrier at the detection time belongs to the uncertain event, the output response value is sometimes indicated as "0" and sometimes as "1" in real detection. Although the output of the bit herein cannot be determined, the output value has an inclination according to the theoretical trap occupancy probability. For example, some MOS device has a trap occupancy probability of 20% at the given detection time, indicating that the trap is more inclined to release the carrier. Through repeated real measurements, the output response value of the MOS device is more indicated as "1" than "0". Therefore, the inclination of the output on the uncertain bit will reduce the information entropy of the key, which will be greatly threatened by the hacker or malicious organization in the context of the machine learning. Consequently, the client repeats the operation instruction of detecting the state of the trap for 10 times with the probabilistic PUF and generates 10 real responses. If the 10 responses on each bit are completely the same, the bit keeps the response value; and if 10 responses on some bit are not completely the same, the client generates a trigger signal to a TRNG and the response value on the bit is replaced by a value generated by the TRNG. At this time, the probability that the "0" or "1" is output on the uncertain bit is equal without the inclination, thereby greatly improving the information entropy of the real code key, reducing the risk of attacks from the machine learning, and achieving the purpose of making the competitor confused.

Although the specific embodiments of the present disclosure have been described above, those skilled in the art should understand that these are only embodiments, and the protection scope of the present disclosure is defined by the appended claims. A person skilled in the art can make various changes or modifications to these implementations without departing from the principle and essence of the present disclosure, but all these changes and modifications shall fall within the protection scope of the present disclosure.

What is claimed is:

1. A physical unclonable function (PUF)-based method for enhancing system reliability, comprising:
    requesting, by a client, data transmission with a server;
    randomly selecting, by the server, a plurality of metal oxide semiconductor (MOS) devices in an MOS array, and acquiring positional information of the plurality of MOS devices;
    calculating, by the server, according to a stored intrinsic parameter of a trap in each of the plurality of MOS devices, a time constant of the trap, calculating a probabilistic PUF for each of the plurality of MOS devices and constructing a probabilistic model;
    randomly generating, by the server, detection time according to the probabilistic model and sending the detection time and the positional information to the client; and
    determining, by the server, a probability that the trap in each of the plurality of MOS devices is occupied at the detection time according to the probabilistic model, and generating a theoretical code key, the theoretical code key comprising a theoretical authentication bit and a theoretical uncertain bit.

2. The PUF-based method for enhancing system reliability according to claim 1, wherein after the sending the detection time and the positional information to the client, the method further comprises:
    positioning, by the client, the plurality of MOS devices by controlling a word line (WL) and a bit line (BL) according to received positional information, and precharging the trap by applying a high bias voltage to the plurality of MOS devices; and
    adjusting the bias voltage for the plurality of MOS devices as a low bias voltage, detecting a carrier release condition of each of the plurality of MOS devices from a moment when the low bias voltage is applied to the detection time, and generating a real code key, the real code key comprising a real authentication bit and a real uncertain bit.

3. The PUF-based method for enhancing system reliability according to claim 2, wherein the client generates the real code key repeatedly:
    the real uncertain bit keeps a generated value when the real uncertain bits generated repeatedly are consistent; and
    the client generates a trigger signal to a true random number generator (TRNG) when the real uncertain bits generated repeatedly are inconsistent, wherein the TRNG generates a signal to replace a value on an inconsistent bit.

4. The PUF-based method for enhancing system reliability according to claim 3, wherein the theoretical code key and the real code key are matched for determination:
    authentication is successful when the theoretical authentication bit is consistent with the real authentication bit; and
    the authentication is unsuccessful when the theoretical authentication bit is inconsistent with the real authentication bit.

5. The PUF-based method for enhancing system reliability according to claim 1, wherein before the requesting, by a client, data transmission with a server, the method further comprises: establishing a database of the probabilistic PUF in the server, wherein a probabilistic model stored in the database significantly reduces a data storage capacity of the server and improves working efficiency of the server.

6. The PUF-based method for enhancing system reliability according to claim 1, wherein the intrinsic parameter comprises: a trap position, a trap energy level, and activation energy.

7. The PUF-based method for enhancing system reliability according to claim 1, wherein the time constant comprises a carrier release time constant and a carrier capture time constant.

8. The PUF-based method for enhancing system reliability according to claim 1, wherein the probabilistic PUF is constructed with random telegraph noise (RTN), and is also constructed with any material or device having a probabilistic change.

9. The PUF-based method for enhancing system reliability according to claim 2, wherein the probabilistic PUF is constructed with random telegraph noise (RTN), and is also constructed with any material or device having a probabilistic change.

10. The PUF-based method for enhancing system reliability according to claim 3, wherein the probabilistic PUF is constructed with random telegraph noise (RTN), and is also constructed with any material or device having a probabilistic change.

11. The PUF-based method for enhancing system reliability according to claim 4, wherein the probabilistic PUF is constructed with random telegraph noise (RTN), and is also constructed with any material or device having a probabilistic change.

12. The PUF-based method for enhancing system reliability according to claim 5, wherein the probabilistic PUF is constructed with random telegraph noise (RTN), and is also constructed with any material or device having a probabilistic change.

13. The PUF-based method for enhancing system reliability according to claim 6, wherein the probabilistic PUF is constructed with random telegraph noise (RTN), and is also constructed with any material or device having a probabilistic change.

14. The PUF-based method for enhancing system reliability according to claim 7, wherein the probabilistic PUF is constructed with random telegraph noise (RTN), and is also constructed with any material or device having a probabilistic change.

* * * * *